United States Patent
Kim et al.

(10) Patent No.: US 10,779,326 B2
(45) Date of Patent: Sep. 15, 2020

(54) CARRIER AGGREGATION METHOD AND DEVICE IN WIRELESS COMMUNICATION SYSTEM

(71) Applicant: Samsung Electronics Co., Ltd., Suwon-si, Gyeonggi-do (KR)

(72) Inventors: Yohan Kim, Yongin-si (KR); Jaewon Kim, Seoul (KR); Keunchul Hwang, Yongin-si (KR); Jeongho Park, Seoul (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/316,412

(22) PCT Filed: Jul. 19, 2017

(86) PCT No.: PCT/KR2017/007766
§ 371 (c)(1),
(2) Date: Jan. 9, 2019

(87) PCT Pub. No.: WO2018/016872
PCT Pub. Date: Jan. 25, 2018

(65) Prior Publication Data
US 2019/0246426 A1   Aug. 8, 2019

(30) Foreign Application Priority Data
Jul. 19, 2016 (KR) .................. 10-2016-0091616

(51) Int. Cl.
*H04W 74/08* (2009.01)
*H04W 72/04* (2009.01)

(52) U.S. Cl.
CPC ..... *H04W 74/0808* (2013.01); *H04W 72/042* (2013.01); *H04W 72/0406* (2013.01); *H04W 72/0453* (2013.01)

(58) Field of Classification Search
CPC ................. H04W 72/042; H04W 72/045
(Continued)

(56) References Cited

U.S. PATENT DOCUMENTS

2010/0296473 A1   11/2010   Kim et al.
2013/0003668 A1   1/2013   Xiao et al.
(Continued)

FOREIGN PATENT DOCUMENTS

KR   10-2015-0020084 A   2/2015
KR   10-1595022 B1   3/2016
(Continued)

OTHER PUBLICATIONS

European Office Action dated Apr. 23, 2019; Reference #: P21760W0EP; Application #/Patent #: 17831345.8-1215/PCT/KR2017007766.

*Primary Examiner* — Angel T Brockman
(74) *Attorney, Agent, or Firm* — Jefferson IP Law, LLP

(57) ABSTRACT

The present invention relates to 5G or pre-5G communication system for supporting a higher data transmission rate after 4G communication system such as LTE. The present invention provides a carrier aggregation method. A method of a base station, according to the present invention, comprises a step for: transmitting and receiving data to and from a terminal by means of a first carrier corresponding to a first bandwidth; transmitting to the terminal, by means of the first carrier, configuration information comprising information for an initial access to a second carrier corresponding to a second bandwidth; and transmitting and receiving data to and from the terminal by means of the second carrier on the basis of the configuration information.

15 Claims, 12 Drawing Sheets

(58) Field of Classification Search
USPC .......................................................... 370/329
See application file for complete search history.

(56) References Cited

U.S. PATENT DOCUMENTS

| | | |
|---|---|---|
| 2015/0063259 A1 | 3/2015 | Gohari et al. |
| 2015/0215926 A1 | 7/2015 | Huang et al. |
| 2016/0182211 A1 | 6/2016 | Choi et al. |
| 2016/0205681 A1 | 7/2016 | Kim et al. |
| 2016/0227602 A1 | 8/2016 | Yi et al. |
| 2017/0208488 A1* | 7/2017 | Hwang ................ H04W 76/34 |

FOREIGN PATENT DOCUMENTS

| | | |
|---|---|---|
| WO | 2015/105353 A1 | 7/2015 |
| WO | 2015/176996 A1 | 11/2015 |

* cited by examiner

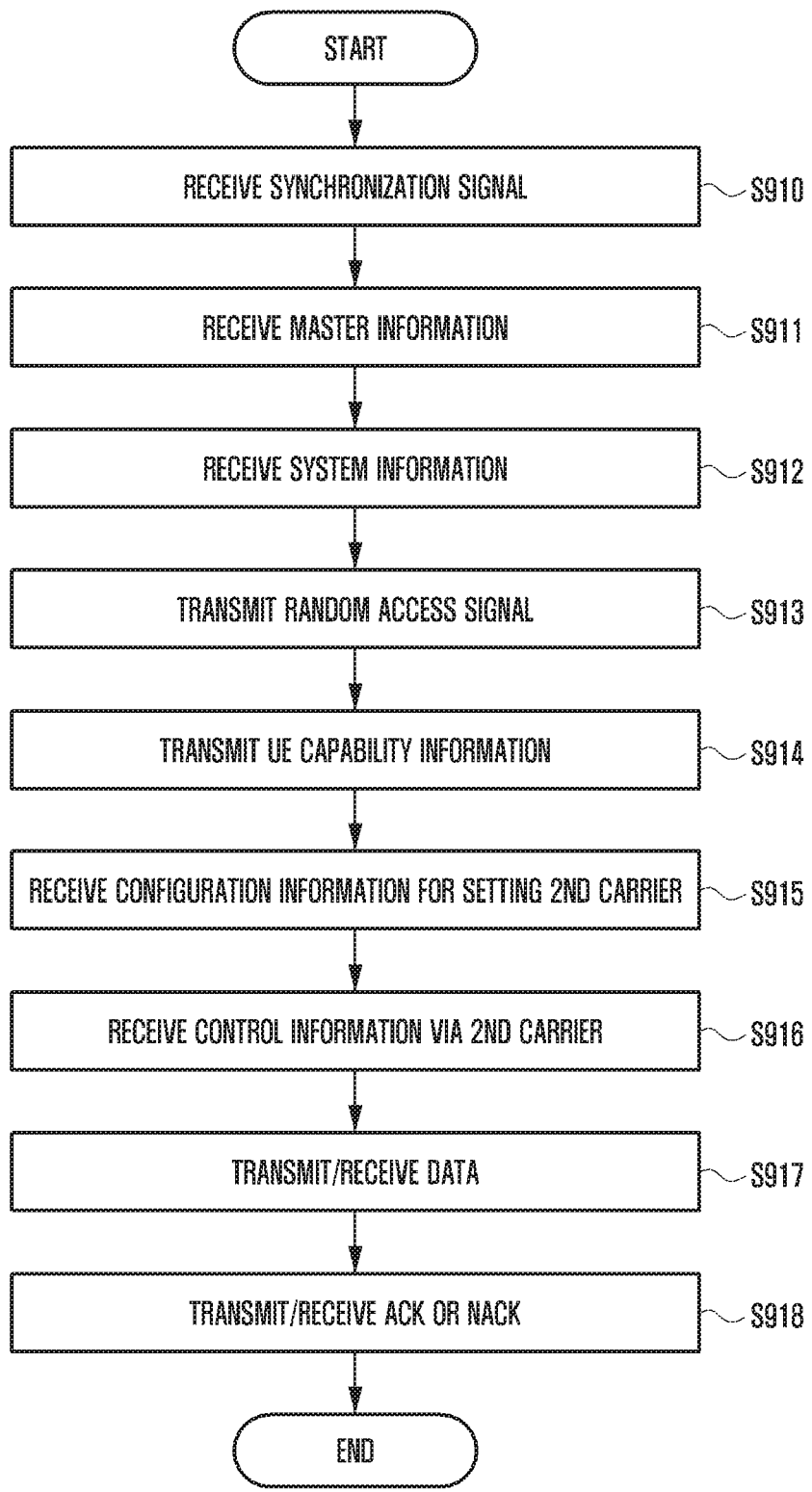

CARRIER AGGREGATION METHOD AND DEVICE IN WIRELESS COMMUNICATION SYSTEM

TECHNICAL FIELD

The present invention relates to a wireless communication system and, more particularly, to a carrier aggregation method and device in the wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the wireless communication technology has recently achieved rapid development, and therefore the communication system technology is also evolving. In recent years, various techniques have been introduced to meet the explosive traffic demand in the wireless communication system, and one of them is carrier aggregation (hereinafter, interchangeably used with CA or frequency aggregation). Contrary to a typical technique of using only a single component carrier (CC) for communication between a terminal (interchangeably used with user equipment (UE), etc.) and a base station (interchangeably used with E-UTRAN NodeB, eNB, etc.), the CA technique further uses a main carrier (interchangeably used with primary cell (PCell)) and one or more subcarriers (interchangeably used with secondary cell (SCell). Accordingly, the CA technique can dramatically increase the transmission amount by the number of added subcarriers.

However, in the LTE system or the 5G system, a predetermined bandwidth is defined for the base station to operate. Therefore, the carrier aggregation using a carrier (or a carrier band) corresponding to a bandwidth other than the predetermined bandwidth is impossible, and this may incur the waste of frequency resources. Accordingly, there is a need for a method of providing carrier aggregation using a carrier corresponding to a bandwidth other than the predetermined bandwidth.

In addition, since a control signal such as a synchronization signal necessary for access should be always transmitted even in the predetermined bandwidth, there is a limit to increase data transmission efficiency. Therefore, a method for solving this problem is also needed.

DISCLOSURE OF INVENTION

Technical Problem

The present invention has been proposed in order to solve the above-mentioned problems, and it is an object of the present invention to provide a method and device for providing carrier aggregation using a carrier corresponding to a bandwidth other than a predetermined bandwidth for a base station.

It is another object of the present invention to provide a method and device capable of transmitting only data without transmitting a control signal or the like necessary for access even in a predetermined bandwidth.

Solution to Problem

In order to solve the above problems, a method of a base station comprises transmitting and receiving data to and from a terminal through a first carrier corresponding to a first bandwidth; transmitting, to the terminal through the first carrier, configuration information including information for an initial access to a second carrier corresponding to a second bandwidth; and transmitting and receiving data to and from the terminal through the second carrier, based on the configuration information.

Also, in order to solve the above problems, a method of a terminal comprises transmitting and receiving data to and from a first carrier corresponding to a first bandwidth; receiving, from the first carrier, configuration information including information for an initial access to a second carrier corresponding to a second bandwidth; and transmitting and receiving data to and from the second carrier, based on the configuration information.

Also, in order to solve the above problems, a base station comprises a transceiver configured to transmit and receive signals to and from other network entity; and a controller configured to transmit and receive data to and from a terminal through a first carrier corresponding to a first bandwidth, transmit, to the terminal through the first carrier, configuration information including information for an initial access to a second carrier corresponding to a second bandwidth, and transmit and receive data to and from the terminal through the second carrier, based on the configuration information.

Also, in order to solve the above problems, a terminal comprise a transceiver configured to transmit and receive signals to and from other network entity; and a controller configured to transmit and receive data to and from a first carrier corresponding to a first bandwidth, receive, from the first carrier, configuration information including information for an initial access to a second carrier corresponding to a second bandwidth, and transmit and receive data to and from the second carrier, based on the configuration information.

Advantageous Effects of Invention

According to the present invention, it is possible to efficiently transmit and receive data without wasting frequency resources by providing carrier aggregation using a carrier (or a carrier band) corresponding to a bandwidth other than a predetermined bandwidth for a base station.

BRIEF DESCRIPTION OF DRAWINGS

FIG. 9 is a diagram illustrating an operation of a terminal according to an embodiment of the present invention.

MODE FOR THE INVENTION

Figure 1:
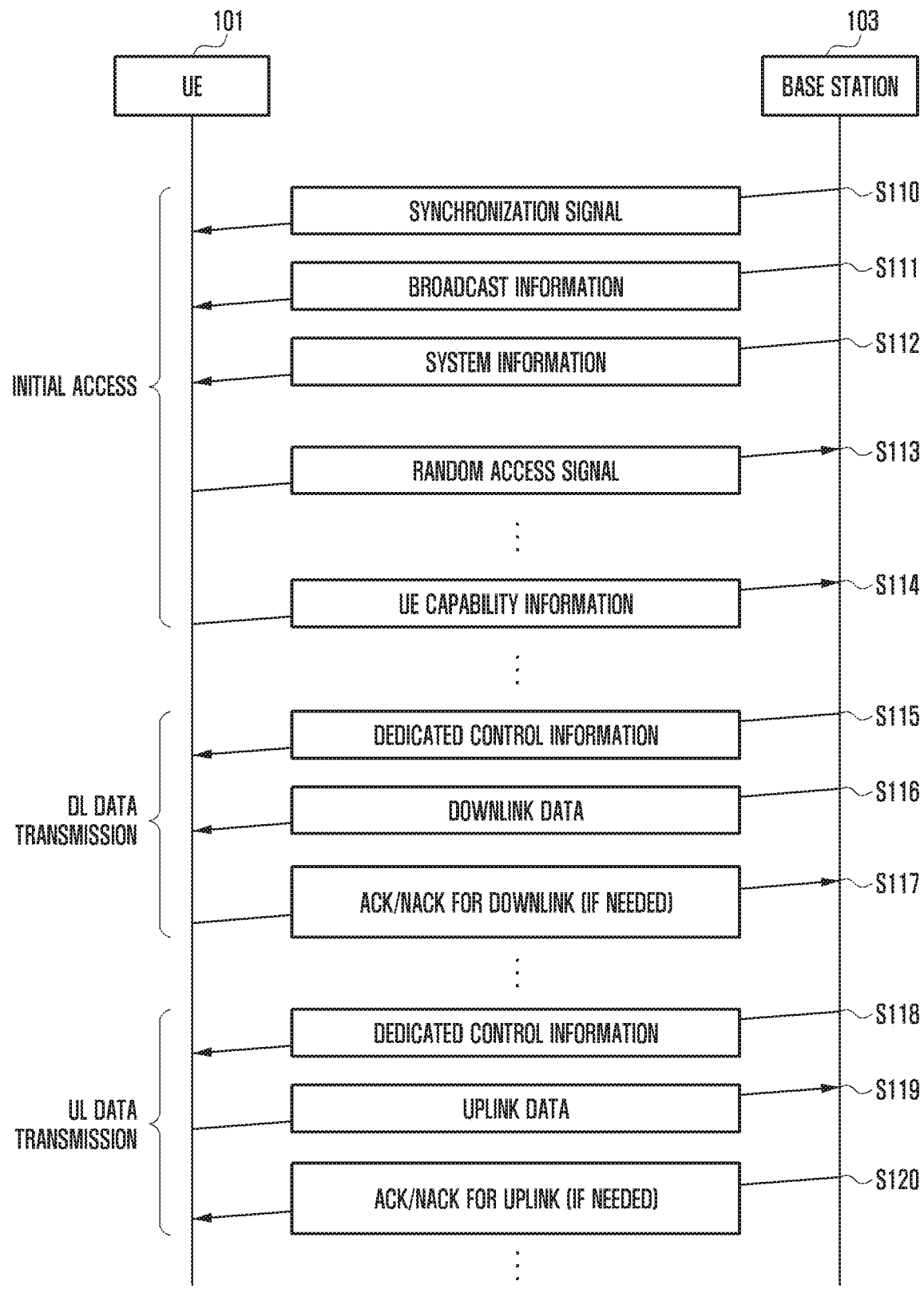
FIG. 1 is a diagram illustrating a message flow between a terminal and a base station according to the present invention.

Now, embodiments of the present invention will be described in detail with reference to the accompanying drawings.

In the following description of embodiments, descriptions of techniques that are well known in the art and not directly related to the present invention are omitted. This is to clearly convey the subject matter of the invention by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

In the disclosure, descriptions of techniques that are well known in the art and not directly related to the present invention are omitted. This is to clearly convey the subject matter of the invention by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to the embodiments described in detail below and with reference to the accompanying drawings. The present invention may, however, be embodied in many different forms and should not be construed as being limited to the embodiments set forth herein. Rather, these embodiments are provided so that this invention will be thorough and complete and will fully convey the scope of the invention to those skilled in the art. To fully disclose the scope of the invention to those skilled in the art, the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, refers to a software or hardware component or device, such as a field programmable gate array (FPGA) or application specific integrated circuit (ASIC), which performs certain tasks. A unit may be configured to reside on an addressable memory medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

The capacity of the communication system can be improved by improving the signal-to-noise ratio (SNR) or by increasing the bandwidth. Assuming the same SNR, it is important to ensure a wide bandwidth for effective data communication because the capacity of the communication system linearly increases as the bandwidth increases. In view of this, the international telecommunication union (ITU) has also proposed a minimum bandwidth of 40 MHz as a requirement of the international mobile telecommunication advanced (IMT-Advanced).

However, ensuring a wide bandwidth in a single band may not be easy depending on country and region. In most countries, the carrier band is divided into bands for military, satellite, communication, broadcasting, etc., and these multipurpose bands are dispersedly allocated.

The carrier aggregation transmission scheme is a technique for collecting frequency bands of non-adjacent carrier bands and logically operating them like one wide band. Therefore, even though they are not consecutive carrier bands, they can be combined and operated as a single bandwidth to improve performance which is felt by UEs.

Currently, the carrier aggregation technique is being used in LTE Rel. 10 or later. According to standards, LTE can use up to 20 MHz band as one frequency band, and bands of 1.4, 3, 5, 10, 15, 20 MHz, etc. are available. However, due to the increasing traffic demand, a bandwidth of 20 MHz or more is required for a higher data rate. In order to support this, the carrier aggregation technique has been introduced in Rel. 10.

The carrier aggregation technique may have the following features.

Each carrier band may be called an element carrier (CC).

In case of carrier aggregation technique, a base station can combine up to five component carriers. That is, the base station can operate (or use) up to a frequency band of 100 MHz(=20 MHz×5).

The base station can operate component carriers (CC) of 1.4, 3, 5, 10, 15, and 20 MHz as in the LTE system. At this time, the available bandwidth can be determined according to the capability of the terminal and the band situation of the network.

The base station can independently transmit data by using each component carrier (CC).

At this time, one component carrier (CC) may be a primary cell (PCell) that manages initial access, handover, etc., and the other component carriers (CC) may be secondary cells (SCell) for data transmission.

The SCell may be set by the PCell, and SCell's system information (also referred to as system information block (SIB), additive system information, or second system information) and upper layer setting information may be delivered by the PCell. Here, the upper layer setting may be, for example, configuration information of the SCell transmitted through a radio resource control (RRC) layer. That is, the UE can receive configuration information for the SCell through RRC signaling from the PCell.

UEs that do not support the CA are accessible to their respective carrier bands.

For both the PCell and the SCell, the UE may perform synchronization acquisition, reception of master information (also referred to as master information block (MIB), broadcast information, main system information, or first system information), channel quality measurement, and the like.

Meanwhile, the system information can be transmitted in two ways through two different transmission channels. The system information may be classified into master information (MIB) transmitted via a broadcast channel (BCH) and system information (SIB) transmitted via a downlink shared channel (DL-SCH). The master information contains information (main system information) necessary for receiving system information, and the other system information (additive system information) transmitted via the DL-SCH may be referred to as the second system information. The UE can directly receive the master information about the SCell, while receiving the system information about the SCell through the PCell.

The above is an example of features of the carrier aggregation technique, and the carrier aggregation technique proposed by the present invention may be applied to any broadband communication system. In this case, the present invention assumes a normal wireless communication system including the following assumptions.

Information (or a common control signal) for an initial access and for maintaining access may be transmitted over the entire frequency band or fixed specific frequency band of each component carrier (CC).

Here, the common control signal may include a synchronization signal (e.g., a primary synchronization signal or a secondary synchronization signal) for synchronizing the base station and the UE.

In addition, the common control signal may include first system information (e.g., master information or referred to as broadcast information) transmitted via a physical broadcast channel (PBCH). Also, the common control signal may include second system information (e.g., SIB).

In addition, the common control signal may include a random access signal transmitted via a physical random access channel (PRACH) for uplink (UL) synchronization and network access.

The bandwidths available for the base station may be predetermined (or predefined). Therefore, the minimum bandwidth of the available bandwidths for the base station may also be defined. For example, in the LTE system, the minimum bandwidth may include 1.4 MHz.

The base station may transmit/receive data for dedicated DL/UL after resource allocation through a control channel Such data may include, for example, data transmitted through a physical downlink shared channel (PDSCH) or a physical uplink shared channel (PUSCH). In addition, the control channel (or dedicated control channel) may include, for example, a physical downlink control channel (PDCCH) or an enhanced physical downlink control channel (EPDCCH). Therefore, after allocating resources to the UE through the control channel, the base station may transmit data to the UE.

The dedicated control channel for allocating resources to transmit data may be localized on the frequency axis. In this case, the localized allocation may mean that one piece of information is not divided into resources within a plurality of frequencies in order to obtain the diversity gain in the frequency axis.

A cell or UE specific reference signal for channel state reporting may be transmitted using a specific bandwidth. The reference signal may include, for example, a common reference signal (CRS) or a channel state information reference signal (CSI-RS). The reference signal may be transmitted using the entire bandwidth or using a partial bandwidth.

A reference signal (e.g., a demodulation reference signal (DMRS)) used for demodulation at the time of data reception may be transmitted only within a band allocated for transmitting data.

Meanwhile, in order to efficiently transmit and receive data in the wireless communication system, a method of aggregating carriers corresponding to a bandwidth other than a predetermined bandwidth for the base station may be considered.

Hereinafter, the predetermined bandwidth available for the base station may be referred to as a first bandwidth, and a bandwidth other than the first bandwidth may be referred to as a second bandwidth.

The second bandwidth may mean a bandwidth not included in the first bandwidth, for example, a bandwidth less than the minimum value of the first bandwidth. Also, in the present invention, the first bandwidth may be interchangeably used with the term full BW, and the second bandwidth may be interchangeably used with the term fragmented BW. In addition, a carrier corresponding to the first bandwidth may be referred to as a first carrier or a first cell, and a carrier corresponding to the second bandwidth may be referred to as a second carrier, a second cell, or a fragmented BW CC.

Alternatively, the second bandwidth in the present invention may be equal to the first bandwidth. However, in this case, the second carrier may be used only for transmitting/receiving data or control information related to the data. Such a second carrier wave may be referred to as a data-related carrier or data only CC.

The above-mentioned second carrier (fragmented BW CC, data only CC) cannot be set to the PCell as described later, and cannot transmit or receive a synchronization signal, broadcast information, or the like.

Thus, when carriers corresponding to the second bandwidth are aggregated, a problem may arise. This will be described in detail below.

FIG. 1 is a diagram illustrating a message flow between a terminal and a base station according to the present invention.

Referring to FIG. 1, at step S110, the terminal (i.e., UE) 101 may receive a synchronization signal from the base station 103 and thereby acquire synchronization with the base station.

Then, at steps S111 and S112, the UE may receive broadcast information (or master information) and system information and thereby identify a network connected to the base station.

In addition, at step S113, the UE may transmit a signal for random access and thereby perform a process of notifying the existence of the UE to the base station and accessing the network.

Also, at step S114, the UE may transmit UE capability information to the base station at the request of the base station (UECapabilityEquiry).

These steps S110 to S114 may refer to an initial access procedure for the UE to access the base station.

Meanwhile, for transmission of downlink (DL) data, the base station may transmit, to the UE at step S115, dedicated control information (hereinafter used interchangeably with control information) that indicates whether a resource for transmitting DL data is allocated or not, and contains resource allocation information.

Therefore, at step S116, the UE may check the control information and receive DL data in the allocated resource.

Further, in case of a system to which a hybrid automatic repeat request (HARQ) is applied, the UE may transmit, to the base station at step S117, acknowledge (ACK) or negative acknowledge (NACK) information that indicates whether the DL data has been received.

Also, as in case of the DL data, the UE may receive, at step S118, dedicated control information that indicates whether a resource for transmitting uplink (UL) data is allocated or not, and contains resource allocation information.

Therefore, at step S119, the UE may check the control information and transmit UL data in the allocated resource.

Then, at step S120, the base station may transmit, to the UE, ACK or NACK information indicating whether the UL data has been received. Alternatively, the base station may transmit dedicated control information for new UL data to the UE without sending the ACK or NACK information when the UL data has been received. This is to implicitly inform the UE that the UL data has been received.

Figure 2:
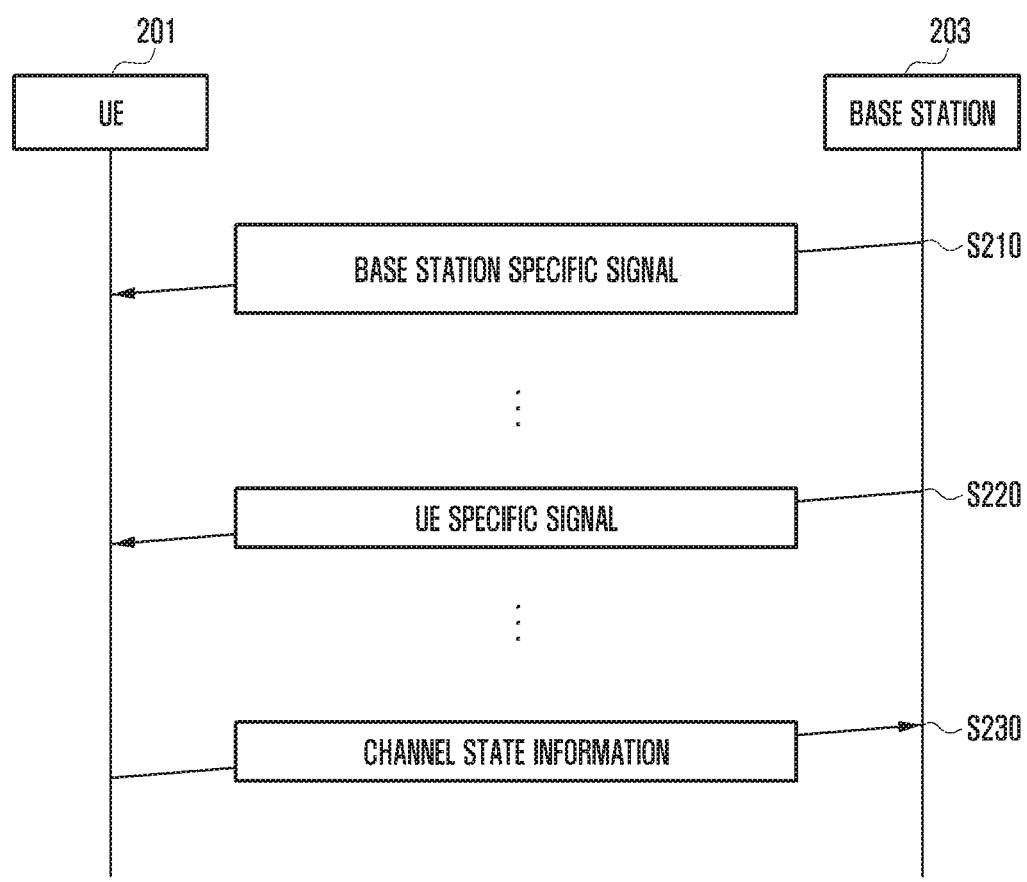
FIG. 2 is a diagram illustrating a method for a terminal to report channel state information according to the present invention.

FIG. 2 is a diagram illustrating a method for a terminal to report channel state information according to the present invention.

Referring to FIG. 2, the UE 201 may receive a reference signal from the base station 203. Specifically, at step S210, the UE may receive a base station specific reference signal (or a cell specific signal).

Also, at step S220, the UE may receive a UE specific reference signal.

Therefore, the UE that receives the reference signal may measure a channel state by using the reference signal and generate channel state information.

Then, at step S230, the UE may transmit the generated channel state information to the base station. The channel state information may be used for handover between base stations, mobility management, and efficient data transmission.

Meanwhile, in a system to which the carrier aggregation is applied, the above processes of FIGS. 1 and 2 may be differently applied to the PCell and the SCell. This will be described later.

Figure 3:
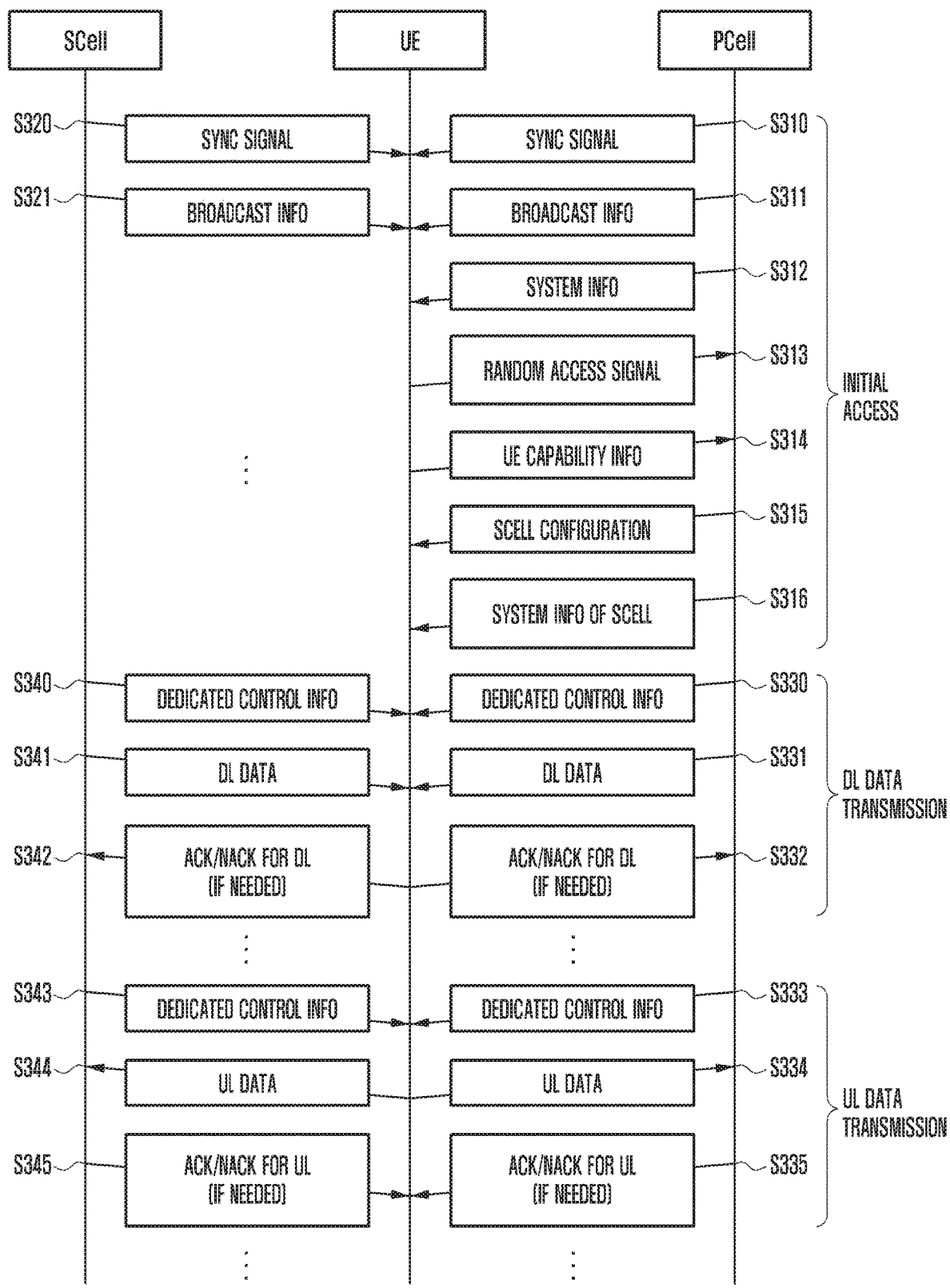
FIG. 3 is a diagram illustrating a message flow between a base station and a terminal in a carrier aggregation state according to the present invention.

FIG. 3 is a diagram illustrating a message flow between a base station and a terminal in a carrier aggregation state according to the present invention.

Referring to FIG. 3, an initial access procedure of steps S310 to S316 may be performed by the PCell. That is, the UE may acquire synchronization with the base station by receiving a synchronization signal from the PCell at step S310, receive a broadcast signal (or master signal) and system information at steps S311 and S312, and transmit a random access signal at step S313.

Also, in order to further set the SCell, the UE may receive configuration information and system information for the SCell from the PCell at steps S315 and S316.

Meanwhile, the UE may synchronize with the SCell by receiving a synchronization signal from the SCell at step S320, and acquire broadcast information (or master information) at step S321.

After completing the initial access, the PCell and the SCell may independently transmit dedicated control information for data transmission. Therefore, the PCell and the SCell may independently transmit and receive data to and from the UE.

Specifically, the PCell may transmit the dedicated control information to the UE at step S330, and transmit DL data to the UE at step S331. Also, the PCell may transmit the dedicated control information to the UE at step S333, and receive UL data from the UE at step S334.

Likewise, the SCell may transmit the dedicated control information to the UE at step S340 independently of the PCell, and transmit DL data to the UE at step S341. Also, the SCell may transmit the dedicated control information to the UE at step S343, and receive UL data from the UE at step S344.

As described above, a process of enabling the UE to use the SCell may be generally set by the PCell (Configuration of SCell). That is, by setting the SCell to the UE at steps S315 and S316, the UE may transmit and receive data to and from the SCell.

In addition, ACK or NACK information for HARQ operation of data may be separately transmitted to the SCell and the PCell, or ACK of the SCell may be collected and transmitted by the PCell.

Also, as in case of transmitting and receiving data, in case of the above-described operation of receiving the reference signal from the base station and transmitting the channel state information, the PCell and the SCell may separately measure and transmit the channel state, or the PCell may collect and transmit the channel state information measured by the SCell.

However, in the wireless communication system assumed in the present invention, transmission of the following signals may be impossible in case of the second carrier (fragmented BW CC or data only CC).

A common control signal for an initial access and for maintaining access: In case of failing to transmit a common control signal and a signal for channel state reporting in the second carrier (fragmented BW CC or data only CC), if the second carrier is set to the SCell, the SCell cannot transmit a synchronization signal and broadcast information (or master information), and this incurs a problem of incapability of communication in the SCell.

A reference signal (a cell-specific reference signal or a UE-specific reference signal) for channel state reporting: When the reference signal for channel state reporting is transmitted in the entire band, and if the second carrier is set to the SCell, it becomes impossible to ensure channel information for channel mobility and data transmission. However, if the reference signal is transmitted in a certain band, the channel state reporting is possible.

Therefore, a communication system using a conventional carrier aggregation scheme is incapable of carrier aggregation using the second carrier (fragmented BW CC or data only CC). This may result in waste of frequency resources.

Hereinafter, a method for enabling efficient data transmission through carrier aggregation using the second carrier will be described.

Figure 4:
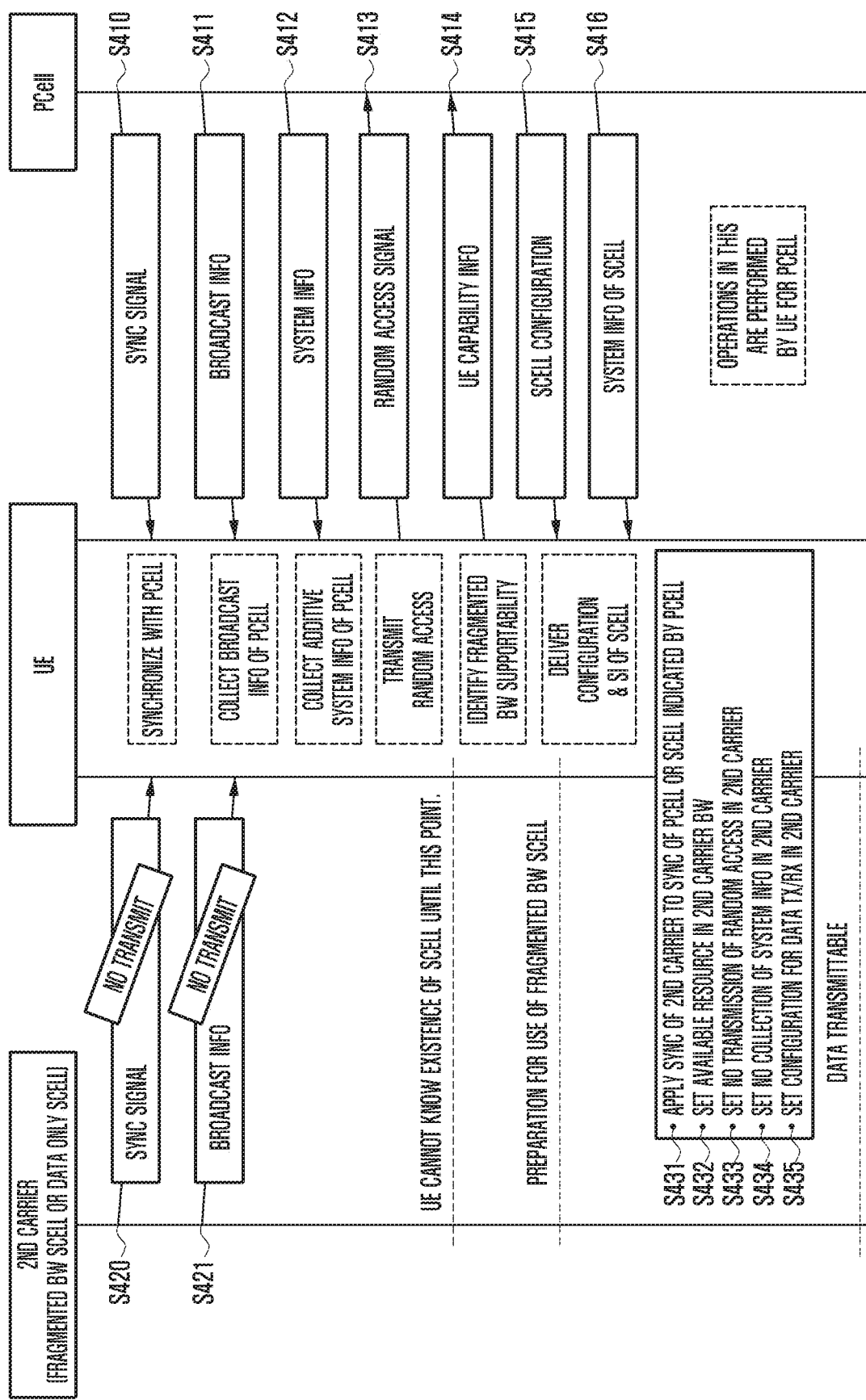
FIG. 4 is a diagram illustrating an initial access procedure of a terminal for carrier aggregation according to an embodiment of the present invention.

FIG. 4 is a diagram illustrating an initial access procedure of a terminal for carrier aggregation according to an embodiment of the present invention.

Before describing FIG. 4, the present invention has the following features.

The present invention provides a carrier aggregation method using the second carrier corresponding to the second bandwidth which is not set to be available for the base station. In this case, an available bandwidth (BW) region of the second carrier may be symmetric or asymmetric with respect to the central frequency. In addition, the present invention provides a carrier aggregation method using the second carrier corresponding to a bandwidth which is set to be available for the base station. In this case, the second carrier is allowed to transmit and receive only data and data-related control information.

In the present invention, a case where the second carrier (fragmented BW CC or data only CC) is used for the SCell will be described as an example. In this case, the second carrier may mean a carrier (fragmented BW CC) corresponding to a bandwidth that is not set to be available for the base station, or a carrier (data only CC) corresponding to a bandwidth that is set to be available for the base station and set to transmit and receive only data and data-relation information. However, the features of the present invention are not limited thereto.

In the present invention, a case where a component carrier (CC) (i.e., the first carrier) other than the second carrier (fragmented BW CC or data only CC) is used for the PCell will be described. Therefore, the PCell may set the second carrier (fragmented BW CC or data only CC) as the SCell to the UE.

The second carrier (fragmented BW CC or data only CC) may not transmit a common control signal for an initial access and for maintaining access. This is because the common control signal may be set to be transmitted in the predetermined first bandwidth and cannot be transmitted in the second bandwidth other than the first bandwidth (e.g., a bandwidth less than the first bandwidth). Alternatively, this is because even if the second carrier is set equal to the first bandwidth, the common control signal may be set not to be transmitted through the second carrier. However, when the common control signal is set to be transmitted in a band lower than the second bandwidth or to be transmitted in the data only CC, the base station may transmit the common control signal through the second carrier. The present invention assumes a situation in which the second bandwidth does not include all or part of a band in which the common control signal is transmitted, or a situation in which the common control signal is set not to be transmitted through the second bandwidth. That is, assumed is a situation in which the common control signal cannot be transmitted in the second bandwidth. However, the present invention is not limited to this situation. Therefore, the initial access and access maintenance procedure using the common control signal may not be performed in the second carrier. The common control signal may include at least one of the following signals.

A synchronization signal for downlink synchronization between the base station and the UE A signal for random access for uplink synchronization and initial access A broadcast information (or master information) signal for transmitting first system information A system information signal for transmitting second system information The UE may not perform synchronization estimation in the second carrier (fragmented BW CC or data only CC). Therefore, the base station and the UE may apply synchronization estimation and channel state report of the PCell or of the SCell which is not the second carrier (fragmented BW CC or data only CC) specified by the PCell. For example, the base station and the UE may apply the synchronization estimation and channel state report of the carrier having the bandwidth closest to the bandwidth of the second carrier.

The UE capable of supporting the first carrier (fragmented BW CC or data only CC) may transmit, to the PCell at the initial access, a UE capability information message that contains information indicating whether the second carrier is supportable. For example, the information indicating whether the second carrier is supportable may be contained as a new field (e.g., FragmentedBWSupported) in the UE capability information. Details will be described later.

When the PCell configures the second carrier (fragmented BW CC or data only CC) to the UE, the PCell may transmit the following information to the UE, and then the UE may apply it. Specifically, the PCell may transmit, to the UE, all the system information necessary for transmitting and receiving data through the second carrier (fragmented BW CC or data only CC). Also, when configuring the SCell to the UE, the PCell may indicate that the SCell may have a predetermined first bandwidth (full BW) or a second bandwidth (fragmented BW) that is a bandwidth other than the first bandwidth.

In addition, an available resource in the bandwidth of the second carrier (fragmented BW CC or data only CC) may be indicated via the PCell. The available resource may be indicated through at least one of a method for indicating one of bandwidth combinations separately defined or a method for explicitly indicating the indices of the start and end of the available resource. The available resource may be symmetric or asymmetric with respect to the central frequency.

In addition, as information necessary for the UE to apply synchronization, a message that contains an instruction to follow the synchronization of the PCell or the SCell specified by the PCell may be delivered to the UE.

The uplink data or downlink data transmission of the second carrier (fragmented BW CC or data only CC) may be performed using available resources in a band. This operation may include the following.

Dedicated control information necessary for data transmission may be transmitted using available resources within a bandwidth.

Data may be transmitted using available resources within the bandwidth.

ACK/NACK information of the data transmission may be transmitted using available resources within the bandwidth.

A reference signal required for demodulating dedicated control information for data transmission, data, and ACK/NACK information may be transmitted using available resources within the bandwidth.

The base station or the terminal may demodulate a signal transmitted in available resources in the second carrier, and the base station or the terminal may receive only signals transmitted in available resources in the second carrier through an analog or digital filter.

Other necessary signals or information may be transmitted utilizing available resources within the available bandwidth of the second carrier (fragmented BW CC or data only CC). An example of such signals or information may include a cell-specific reference signal or UE-specific reference signal for channel state reporting. However, if such a signal is transmitted using a band exceeding the available bandwidth, it may not transmit the signal.

If the requested bandwidth of the cell-specific reference signal or UE-specific reference signal for channel state reporting is greater than the available bandwidth of the second carrier (fragmented BW CC or data only CC), the corresponding signal may not be transmitted.

In this case, the PCell does not transmit the corresponding signal on the second carrier (fragmented SCell or data only CC) set to the SCell, and may use the channel state report of the PCell or the SCell designated by the PCell.

Now, a carrier aggregation method having the above features will be described in detail.

Hereinafter, a method of aggregating the PCell and the second carrier at the terminal will be described. In this case, the second carrier means a carrier corresponding to a bandwidth other than a predetermined bandwidth for the base station, or a carrier corresponding to the predetermined bandwidth for the base station and configured to transmit data and data-related control information. Since the present invention describes the SCell as an example, it may be interchangeably used with terms such as fragmented BW CC, fragmented BW SCell, data only CC, and data only SCell.

Referring to FIG. 4, at step S410, the UE may receive a synchronization signal and synchronize with the PCell by using the synchronization signal. As described above, the PCell may be set as the first carrier corresponding to a predetermined bandwidth.

In addition, the UE may collect broadcast information (or master information) of the PCell by receiving broadcast information at step S411, and may collect system information (e.g., SIB) from the PCell at step S412.

At step S413, the UE that collects the system information may perform a random access procedure by transmitting a random access signal.

Also, the UE may receive a message requesting capability information of the UE from the PCell, and then transmit a message including the UE capability information to the PCell at step S414.

At this time, the UE may insert information (hereinafter referred to as a second bandwidth support indicator) indicating whether the second bandwidth (fragmented BW) is supportable, in the UE capability information to be transmitted to the PCell. However, embodiments of the present invention are not limited to this. The UE may insert, in the UE capability information, a second carrier support indicator which is information indicating whether the second carrier having the same bandwidth as the first bandwidth and configured to transmit only data and data-related control information is supportable.

In the UE capability information, the second bandwidth support indicator may be contained as a FragmentedBW-Support field, for example, as shown below. Thus, if FragmentedBWSupport is set to supported, it may indicate that the UE supports the second bandwidth. However, this field is only an example of the present invention, and the scope of the present invention is not limited thereto. That is, the name of the field may be changed.

The UE capability information may be configured as shown in Table 1 below.

TABLE 1

```
UE-Capability : : =        SEQUENCE {
    accessStratumRelease           AccessStartumRelease,
    ue-Category                    INTEGER (1...),
    pdcp-Parameters                PDCP-Parameters,
    phyLayerParameters             PhyLayerParameters,
    rf-Parameters                  RF-Parameters,
    measParameters                 MeasParameters,
    ...
}
RF-Parameters : : =        SEQUENCE {
    supportedBandList              SupportedBandList
}
RF-Parameters : : =        SEQUENCE {
    supportedBandCombination       SupportedBandCombination
}
```

TABLE 1-continued

```
SupportedBandCombination : : = SEQUENCE (SIZE (1..maxBandComb)) OF BandCombinationParameters
BandCombinationParameters : : =    SEQUENCE {
    multipleTimingAdvance           ENUMERATED {supported}         OPTIONAL,
    simultaneousRx-Tx               ENUMERATED {supported}         OPTIONAL,
    bandParameterList               SEQUENCE (SIZE (1..maxSimultaneousBands)) OF BandParameters-
    OPTIONAL,
    ...
}
BandParameters : : = SEQUENCE {
    bandEUTRA                       FreqBandIndicator,
    bandParametersUL                BandParametersUL               OPTIONAL,
    bandParametersDL                BandParametersDL               OPTIONAL,
    FragmentedBWSupport             ENUMERATED {supported, notsupported}
}
```

The PCell that receives the UE capability information may transmit configuration information of the SCell to the UE at step S415. Also, the PCell may transmit the system information of the SCell to the UE at step S416. The system information of the SCell may be contained in the SCell configuration information or transmitted in a separate message. The SCell configuration information or a separate message containing the SCell system information may be transmitted through an RRC layer.

On the other hand, referring to S420 and S421, the second carrier (SCell) corresponding to the second bandwidth may not transmit the synchronization signal and the broadcast information (or master information) to the UE. Therefore, the UE cannot know the existence of the second carrier until it transmits the random access signal. However, if the UE transmits the UE capability information containing the second bandwidth support indicator after performing the random access procedure, the PCell may transmit, to the UE, the SCell configuration information for setting the second carrier to the SCell, so that the UE can prepare for using the second carrier as the SCell.

Specifically, the PCell may transmit the following information to set the second carrier to the SCell.
  system information of the second carrier
  information indicating that the second carrier operates in the second bandwidth (or has a fractional BW) or information indicating that the second carrier operates in the first bandwidth and is used only to transmit and receive data and data-related control information
  Configuration information indicating that the synchronization and channel state of the second carrier (fragmented BW SCell or data only SCell) follow those of the PCell or the SCell designated by the PCell
  Information indicating available resources within the bandwidth of the second carrier (fragmented BW SCell or data only SCell). Here, the available resources may explicitly indicate a combination of separately defined resources or indices of the start and end of the bandwidth of the available resources.
  Information indicating whether a reference signal for channel states reporting is supportable, and available bandwidth configuration information Such information may be contained in the configuration information transmitted at step S415 and transmitted to the UE. Alternatively, such information may be contained in a separate message and transmitted to the UE. The configuration information or the separate message may be referred to as an upper layer signaling message or an upper layer message. Here, the upper layer may include, for example, a radio resource control layer. For example, the upper layer message transmitted to the UE may be expressed as shown in Table 2 below.

TABLE 2

```
RRCConnectionReconfiguration ::=                            SEQUENCE {
    rrc-TransactionIdentifier                                   RRC-TransactionIdentifier,
    criticalExtensions                                          CHOICE {
        c1                                                          CHOICE{
            rrcConnectionReconfiguration-r8                             RRCConnectionReconfiguration -IEs,
            spare7 NULL,
            spare6 NULL, spare5 NULL, spare4 NULL,
            spare3 NULL, spare2 NULL, spare1 NULL
        },
        criticalExtensionsFuture                                SEQUENCE { }
    }
}

RRCConnectionReconfiguration -IEs ::= SEQUENCE {
    measConfig                          MeasConfig                              OPTIONAL, -- Need ON
    mobilityControlInfo                 MobilityControlInfo                     OPTIONAL, -- Cond HO
    dedicatedInfoNASList                SEQUENCE (SIZE(1. .maxDRB)) OF
                                        DedicatedInfoNAS                        OPTIONAL, -- Cond
nonHO
    radioResourceConfigDedicated        RadioResourceConfigDedicated            OPTIONAL, -- Cond HO-
    securityConfigHO                    SecurityConfigHO                        OPTIONAL, -- Cond HO
    nonCriticalExtension                RRCConnectionReconfiguration            OPTIONAL -- Need OP
    ...
}
```

TABLE 2-continued

```
RRCConnectionReconfiguration -IEs ::= SEQUENCE {
    sCellToReleaseList              SCellToReleaseList              OPTIONAL, -- Need ON
    sCellToAddModList               SCellToAddModList               OPTIONAL, -- Need ON
    nonCriticalExtension            RRCConnectionReconfiguration -IEs   OPTIONAL -- Need OP
    ...
}

SCellToAddModList::=            SEQUENCE (SIZE (1..maxSCell-r10)) OF SCellToAddMod SCellToAddMod::=                SEQUENCE {
    sCellIndex                      SCellIndex,
    cellIdentification              SEQUENCE {
        physCellId                      PhysCellId,
        dl-CarrierFreq                  ARFCN-Value
        FragmentedBWSCell               ENUMERATED{Fragmented, Notfragmented}
    }                                                                   OPTIONAL, -- Cond SCellAdd
    radioResourceConfigCommonSCell  RadioResourceConfigCommonSCell  OPTIONAL, -- Cond SCellAdd
    radioResourceConfigDedicatedSCell  RadioResourceConfigDedicatedSCell  OPTIONAL, -- Cond SCellAdd2
    ...,
}

...;
RadioResourceConfigSCell::= SEQUENCE {
    -- DL configuration as well as configuration applicable for DL and UL
    nonUL-Configuration             SEQUENCE {
        -- 1: Cell characteristics
        dl-Bandwidth                    ENUMERATED {n6, n15, n25, n50, n75, n100, Fragmented}
        -- 2: Physical configuration, general
        ...
        Synchronization-reference       Cell_Num
        Available-resourceblock
            Option 1) Indicate one of combinations of predetermined resource blocks
                Combination number
                    Ex) combination number 0 = RB10~RB50
                        combination number 1 = RB20~RB60
                        ...
            Option 2) Explicitly inform index of available resource block
                Ex)
                    StartRB_index {10}
                    EndRB_index {50}
        SCell-systeminformation
        CSI-configuration
            ...
            CSI-supported   ENUMERATE{supported, notsupported}
        CSI-Available-resourceblock
            Option 1) Indicate one of combinations of predetermined resource blocks
                Combination number
                    Ex) combination number 0 = RB10~RB50
                        combination number 1 = RB20~RB60
                        ...
            Option 2) Explicitly inform index of available resource block
                Ex)
                    StartRB_index {10}
                    EndRB_index {50}
            Option 3) Determine types of some reference signals and inform one of them
                Reference_Signal_type ENURMERATED{FullBW, HalfBW, QuarterBW,...}
    },
    -- UL configuration
    ul-Configuration                SEQUENCE {
        ul-FreqInfo                     SEQUENCE {
            ul-CarrierFreq                  ARFCN-ValueEUTRA            OPTIONAL, -- Need OP
            ul-Bandwidth                    ENUMERATED {n6, n15, n25, n50, n75, n100 Fragmented}|
        ...
}
```

The upper layer message may contain information (SCell-ToAddMod) for adding the SCell, and the SCellToAddMod may include information indicating whether the added SCell is the second carrier (FragmentedBWSCell or data only SCell). If the second carrier indicator information (FragmentedBWSCell) is set to Not Fragmented, the UE and the base station may perform communication by adding the SCell in accordance with a normal CA procedure. On the other hand, if the second carrier indicator information (Fragmented BWSCell) is set to Fragmented, the UE may operate according to the method described in the present invention.

Alternatively, in the upper layer message, the second carrier indicator information may be represented by data only SCell. When the second carrier indicator information (data only SCell) is set to Not True, the UE and the base station may perform communication by adding the SCell in accordance with a normal CA procedure.

On the other hand, when the second carrier indicator information (data only SCell) is set to True, the UE may operate according to the method described in the present invention.

Further, Not Fragmented and Fragmented as described above may be indicated by using 1-bit information, and also Not True and True may be indicated using by 1-bit information.

In addition, information (dl-Bandwidth) related to a downlink bandwidth contained in the SCell resource configuration information (RadioResourceConfigSCell) for setting the resources of the SCell may include information indicating whether the downlink bandwidth is the second bandwidth.

When the downlink bandwidth is set to the second bandwidth, the PCell may set the information (dl-Bandwidth) related to the downlink bandwidth as fragmented. Thus, when the downlink bandwidth related information (dl-Bandwidth) is set as fragmented, the UE may know that the downlink bandwidth is the second bandwidth.

Likewise, uplink bandwidth related information (ul-Bandwidth) may include information indicating whether the uplink bandwidth is the second bandwidth. When the uplink bandwidth is set to the second bandwidth, the PCell may set the uplink bandwidth related information (ul-Bandwidth) as fragmented. Thus, if the uplink bandwidth related information (ul-Bandwidth) is set as fragmented, the UE may know that the uplink bandwidth is the second bandwidth.

Meanwhile, when the downlink bandwidth of the second carrier is set to the first bandwidth, the PCell may insert the second carrier indicator in the SCell resource configuration information (RadioResourceConfigSCell).

Also, synchronization-reference signal related information (Synchronization-reference) may include information indicating a cell to be synchronized. For example, the PCell may set the synchronization of the second carrier to be matched with the synchronization of a carrier corresponding to a bandwidth adjacent to the second bandwidth. Therefore, the PCell may set a cell number (Cell_Num) of the synchronization-reference signal related information (Synchronization-reference) to the number of the carrier corresponding to the bandwidth adjacent to the second bandwidth. However, a method of determining the cell to be synchronized by the PCell is not limited thereto, and the PCell may include the cell number thereof or the cell number of any SCell in the synchronization-reference signal related information (Synchronization-reference). Therefore, the UE may perform synchronization using the synchronization of the cell included in the synchronization-reference signal related information (Synchronization-reference). In addition, the UE may transmit channel state information of a cell included in the synchronization-reference signal related information (Synchronization-reference) to the second carrier according to circumstances.

In addition, available-resource related information (Availabe-resourceblock) may mean information indicating a resource block (available resource) available in the corresponding SCell. As described above, the available resources may explicitly indicate a combination of separately defined resources or the stat and end of the bandwidth of available resources.

A method of indicating a combination of resources defined separately is to indicate one of predetermined combinations of resource blocks, for example, as a combination number. Therefore, the available resource related information (Availabe-resourceblock) may include a combination number. For example, combination number=0 may indicate RB 10 to RB 50, and combination number=1 may indicate RB 20 to RB 60. However, the above description is merely an example, and the combination of resources defined separately may be variously configured according to a predetermined method. In addition, the information related to a combination of resources (e.g., a combination number and an index of a corresponding resource block) may be stored in advance in the UE and the base station.

Alternatively, a method of indicating the start and end of the bandwidth of the available resources may refer to a method of explicitly indicating the index of the stat and end of the available resource block. Therefore, the available resource related information (Availabe-resourceblock) may include an index of a start resource block (start RB) and an index of an end resource block (end RB). For example, the available resource related information (Available-resourceblock) may be set to StartRB_index {10} and EndRB_index {50}. In this case, the available resources may include resource block 10 to resource block 50.

In addition, the upper layer message may contain the system information of the SCell (SCell-systeminformation). The SCell system information may include system information excluding the broadcast information (or master information) for the second carrier (fragmented CC or data only CC).

In addition, the upper layer message may contain channel state information configuration information (CSI-configuration). Here, the channel state information configuration information (CSI-configuration) may include configuration information for channel state reporting of the second carrier. Since the channel state information configuration information includes information on resources through which the reference signal can be transmitted, this may be interchangeably used with reference signal related information in the present invention.

The channel state information configuration information (CSI-configuration) may include CSI support information (CSI-supported) and CSI available resource information (CSI-available-resourceblock).

The CSI support information (CSI-supported) may indicate whether reporting of the channel state information is supported. Since the common reference signal or channel state information reference signal is transmitted through the entire band, the reference signal information may not be transmitted in a bandwidth other than the predetermined first bandwidth. Therefore, when the CSI support information (CSI-supported) is set as notsupported, the reporting of the channel state information is not supported, and the UE may use the channel state information of another cell. Therefore, the UE may use the channel state information of the cell indicated by the synchronization reference signal related information (Synchronization-reference).

On the other hand, a reference signal transmitted through a partial band may be defined. Therefore, when the reference signal can be transmitted in the second bandwidth, the CSI support information (CSI-supported) may be set as supported. In this case, the PCell may set an available band to transmit a reference signal for reporting the channel state information through CSI available resource information (CSI-available-resourceblock). The CSI available resource may explicitly indicate a combination of separately defined resources or indices of the start and end of the bandwidth of the available resource, or the type of at least one reference signal may be determined and informed to the UE.

A method of indicating a combination of resources defined separately is to indicate one of predetermined combinations of resource blocks, for example, as a combination number. Therefore, the CSI available resource information (CSI-Availabe-resourceblock) may include a combination number. For example, combination number=0 may indicate RB 10 to RB 50, and combination number=1 may indicate RB 20 to RB 60. However, the above description is merely an example, and the combination of resources defined separately may be variously configured according to a predetermined method. In addition, the information related to a combination of resources (e.g., a combination number and an index of a corresponding resource block) may be stored in advance in the UE and the base station.

Alternatively, a method of indicating the start and end of the bandwidth of the available resources may refer to a method of explicitly indicating the index of the stat and end of the available resource block. Therefore, the CSI available resource information (CSI-Availabe-resourceblock) may include an index of a start resource block (start RB) and an index of an end resource block (end RB). For example, the available resource related information (Available-resourceblock) may be set to StartRB_index {10} and EndRB_index {50}. In this case, the available resources for the CSI may include resource block 10 to resource block 50.

Alternatively, a method of informing the type of the reference signal may mean a method of notifying the CSI available resource information (CSI-Available-resourceblock) containing reference signal type information (Reference_Signal_type) to the UE. For example, the type of the reference signal may be determined according to the configuration of the resource through which the reference signal is transmitted. Although the common reference signal or channel state information reference signal is transmitted over the entire band, the reference signal transmitted over a partial band may be defined. Therefore, in this case, the types of the reference signal may be classified into a reference signal transmitted through the entire band, a reference signal transmitted through the ½ band, and a reference signal transmitted through the ¼ band, and the CSI available resource information (CSI-Available-resourceblock) may contain information such as Reference_Signal_type ENURMERATED {FullBW, HalfBW, QuarterBW, . . . }. Therefore, the UE may know, from the type of the reference signal, the band through which the reference signal is transmitted, and may perform the channel estimation by receiving the reference signal even in the second bandwidth.

Meanwhile, the name of information included in the above-described message is merely an example for convenience of explanation, and the name of information may be changed.

The UE that receives the SCell configuration information and the system information may know that the received configuration information is for the second carrier. As described above, when the second carrier indicator information (FragmentedBWSCell) is set as fragmented, or when the second carrier indicator information (data only SCell) is set as True, the UE may identify the configuration information for the second carrier.

If the second carrier is set, the UE may perform (or set) the following operation.

At step S431, the UE may apply the synchronization of the second carrier (Fragmented SCell or data only SCell) to the synchronization of the PCell or the SCell indicated by the PCell. The UE may apply the synchronization of a cell indicated by the synchronization-reference signal related information (Synchronization-reference) contained in the upper layer message to the synchronization of the second carrier.

At step S432, the UE may identify and set available resources in the bandwidth of the second carrier (Fragmented BW SCell or data only SCell). That is, the UE may be configured to transmit and receive data in the available resources within the second bandwidth or the first bandwidth. At this time, the UE may identify the resources available for the UE by checking the resources indicated by the available resource related information (Available-resourceblock) included in the upper layer message.

In addition, the UE may search for a dedicated control channel within the available bandwidth of the second carrier (Fragmetned BW SCell or data only SCell). That is, unlike a method of searching for a dedicated control channel in the entire band, the UE may search for a dedicated control channel only within the bandwidth of available resources when the available resources are identified. For example, in the LTE, the UE may search for candidates by limiting a search space of an EPDCCH to an available bandwidth of the second carrier.

At step S433, the UE may set or configure not to transmit the random access signal in the second carrier (Fragmented BW SCell or data only SCell).

At step S434, the UE may set or configure not to collect the system information in the second carrier (Fragmented BW SCell or data only SCell).

At step S435, the UE may set a configuration for transmitting and receiving data in the second carrier (Fragmented BW SCell or data only SCell). This includes both demodulating signals only in the second carrier and receiving only signals in the second carrier via an analog or digital filter.

When the initial access procedure is completed as described above, the UE performs network access management and data transmission through the PCell and in the second carrier (Fragmented BW SCell or data only SCell) performs only data transmission/reception without performing other operation.

On the other hand, in a normal SCell, all of the synchronization signal, the broadcast information (or master information), and the system information may be received.

Figure 5:
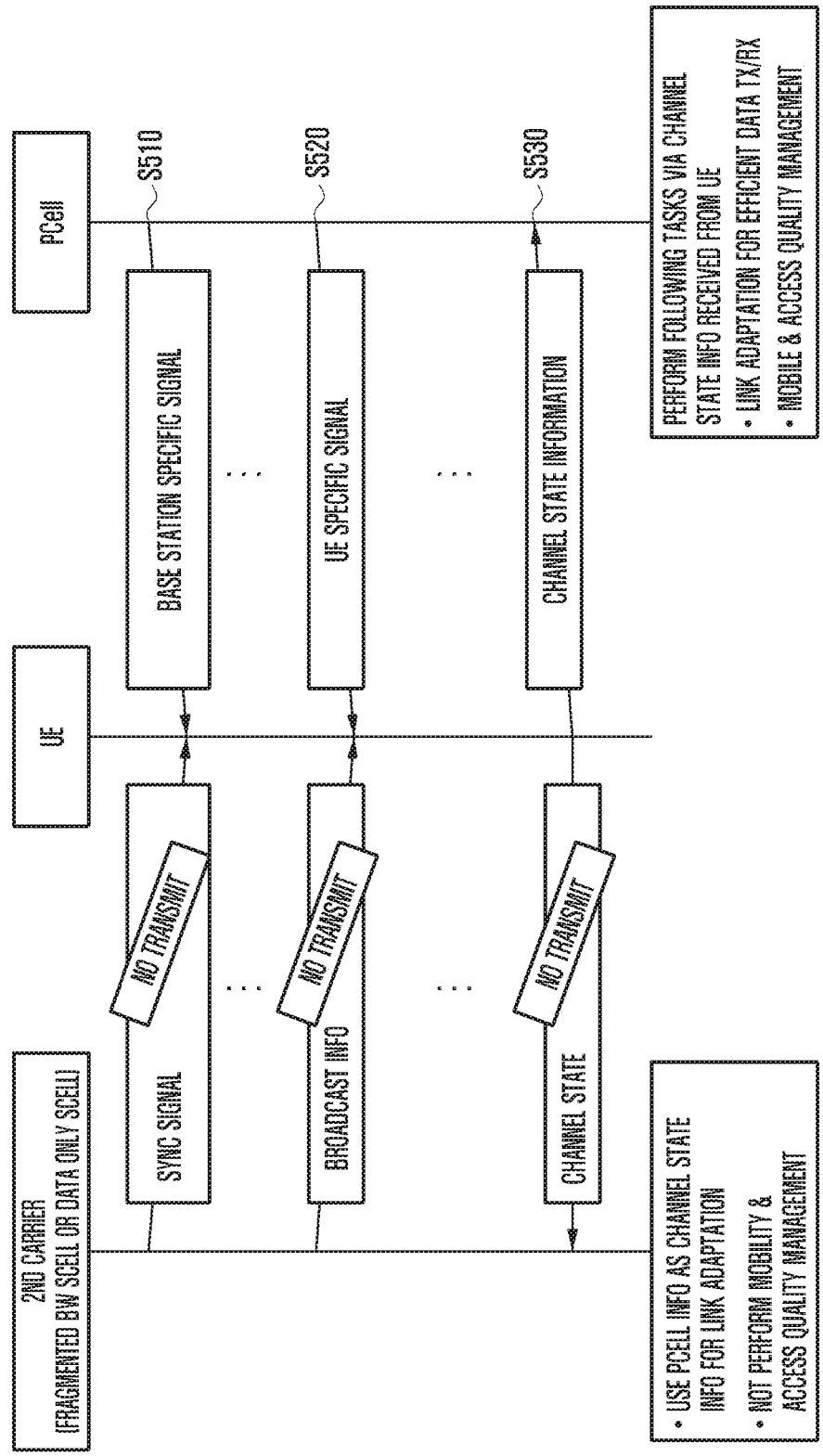
FIG. 5 is a diagram illustrating a method for a terminal to transmit channel state information for carrier aggregation according to an embodiment of the present invention.

FIG. 5 is a diagram illustrating a method for a terminal to transmit channel state information for carrier aggregation according to an embodiment of the present invention.

Referring to FIG. 5, at step S510, the PCell may transmit a base station-specific reference signal or a cell-specific reference signal to the UE. Also, at step S520, the PCell may transmit a UE-specific reference signal to the UE.

Therefore, at step S530, the UE may generate the channel state information by using the base station-specific reference signal and the UE-specific reference signal and transmit the channel state information to the PCcell.

Therefore, using the received channel state information, the PCell may manage the link adaptive transmission and the mobility and access quality for efficient data transmission/reception.

Like the PCell, a normal SCell may receive the channel state information from the UE, based on the reference signal. Thus, like the PCell, the SCell may perform the link adaptive transmission.

On the other hand, the second carrier may not transmit the base station-specific reference signal and the UE-specific reference signal to the UE. This is because a common reference signal or a channel state information reference signal is set to be transmitted through the entire band and thus this may not be received in the second bandwidth which is a bandwidth other than the predetermined first bandwidth. Or this is because a common reference signal or a channel state information reference signal may be set not to be transmitted on the second carrier. Therefore, the second carrier does not transmit the reference signal to the UE, and thus may not receive the channel state information.

Therefore, the second carrier may perform the link adaptation using the channel state information of the PCell or the SCell determined by the PCell, and may not perform the mobility and access quality control.

To this end, the UE may transmit the channel state information of a cell indicated by the synchronization-reference signal related information (Synchronization-reference) contained in an upper layer message received from the PCell to the second carrier, and the second carrier may perform the link adaptation using the received channel state information.

However, a reference signal transmitted through a partial band may be defined, and when the reference signal can be transmitted in the second bandwidth, reporting of the channel state information may be possible using the reference signal.

Figure 6:
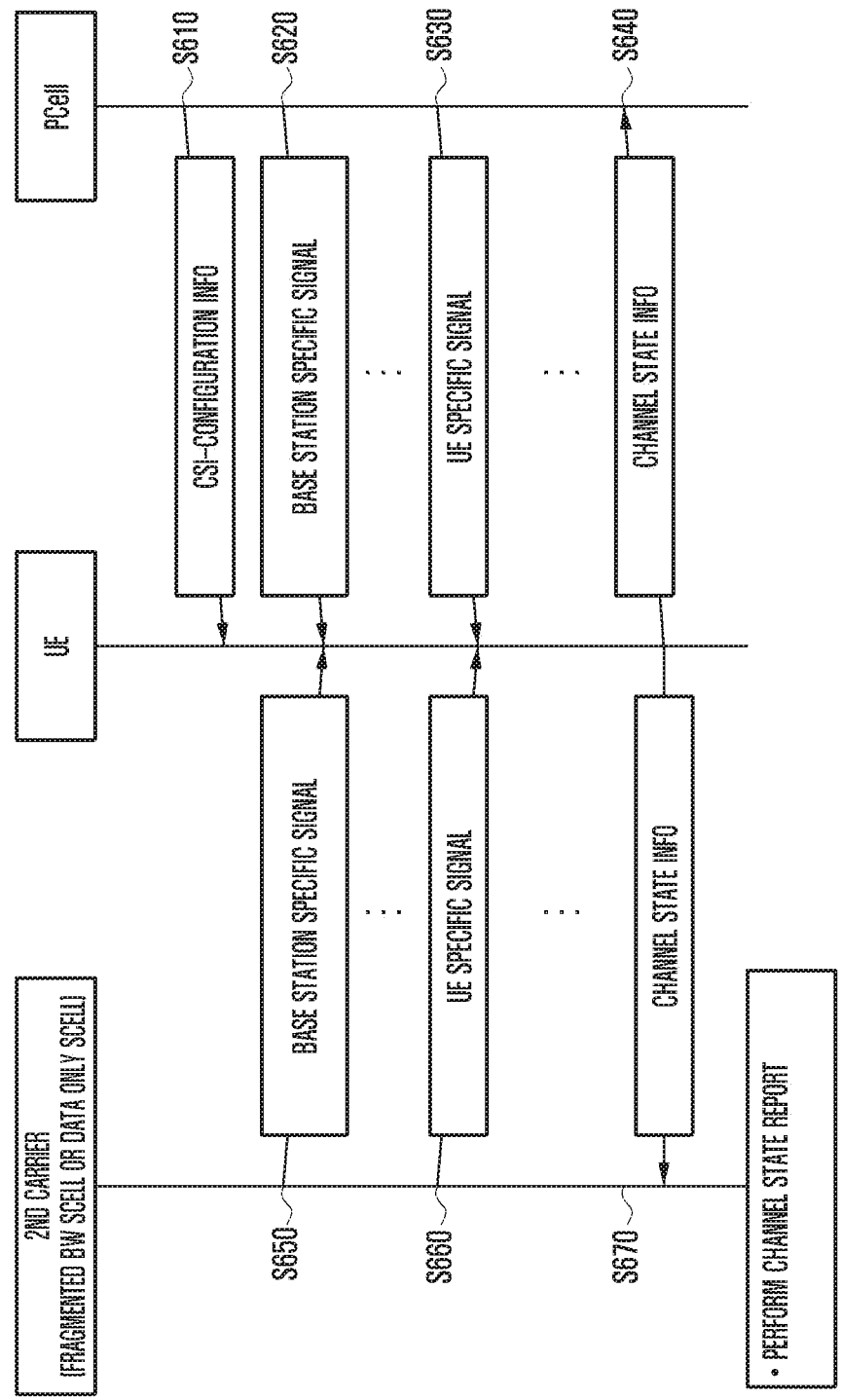
FIG. 6 is a diagram illustrating another method for a terminal to transmit channel state information for carrier aggregation according to an embodiment of the present invention.

FIG. 6 is a diagram illustrating another method for a terminal to transmit channel state information for carrier aggregation according to an embodiment of the present invention.

As described above, when the reference signal can be transmitted in the second bandwidth, it is possible to report the channel state information by using the reference signal.

Therefore, at step S610, the PCell may transmit configuration information (or reference signal configuration information) for reporting the channel state information of the second carrier to the UE by including it in an upper layer message. The CSI-configuration information may include the CSI support information (CSI-supported) and the CSI available resource information (CSI-available-resourceblock). The details are the same as those described above, and are omitted in the following.

In addition, the PCell may transmit the base station-specific reference signal or the cell-specific reference signal to the UE at step S620 in order to receive the channel state information on the PCell, and transmit the UE-specific reference signal to the UE at step S630.

Therefore, at step S640, the UE generates the channel state information by using the base station-specific reference signal and the UE-specific reference signal and transmits the channel state information to the PCell.

Therefore, using the received channel state information, the PCell may manage the link adaptive transmission and the mobility and access quality for efficient data transmission/reception.

Meanwhile, according to the configuration of the PCell, the UE may receive the reference signal from the second carrier. Specifically, when the CSI support information (CSI-supported) received by the UE is configured to support reporting of the channel state information, the second carrier may transmit the reference signal in the CSI available resource.

Therefore, the second carrier may transmit the base station-specific reference signal to the UE at step S650, and may transmit the UE-specific reference signal to the UE at step S660.

At this time, the CSI available resource in which the reference signal is transmitted may be notified to the UE through the CSI available resource information (CSI-Available-resourceblock) included in the upper layer message. Therefore, the UE may receive the reference signal transmitted from the second carrier in the resource indicated in the CSI available resource information (CSI-Available-resourceblock).

Therefore, at step S670, the UE may generate the channel state information, based on the reference signal received from the second carrier, and transmit the channel state information to the second carrier.

The second carrier may receive the channel state information from the UE, and may manage the link adaptation transmission and the mobility and access quality for efficient data transmission/reception by using the received channel state information.

Figure 7:
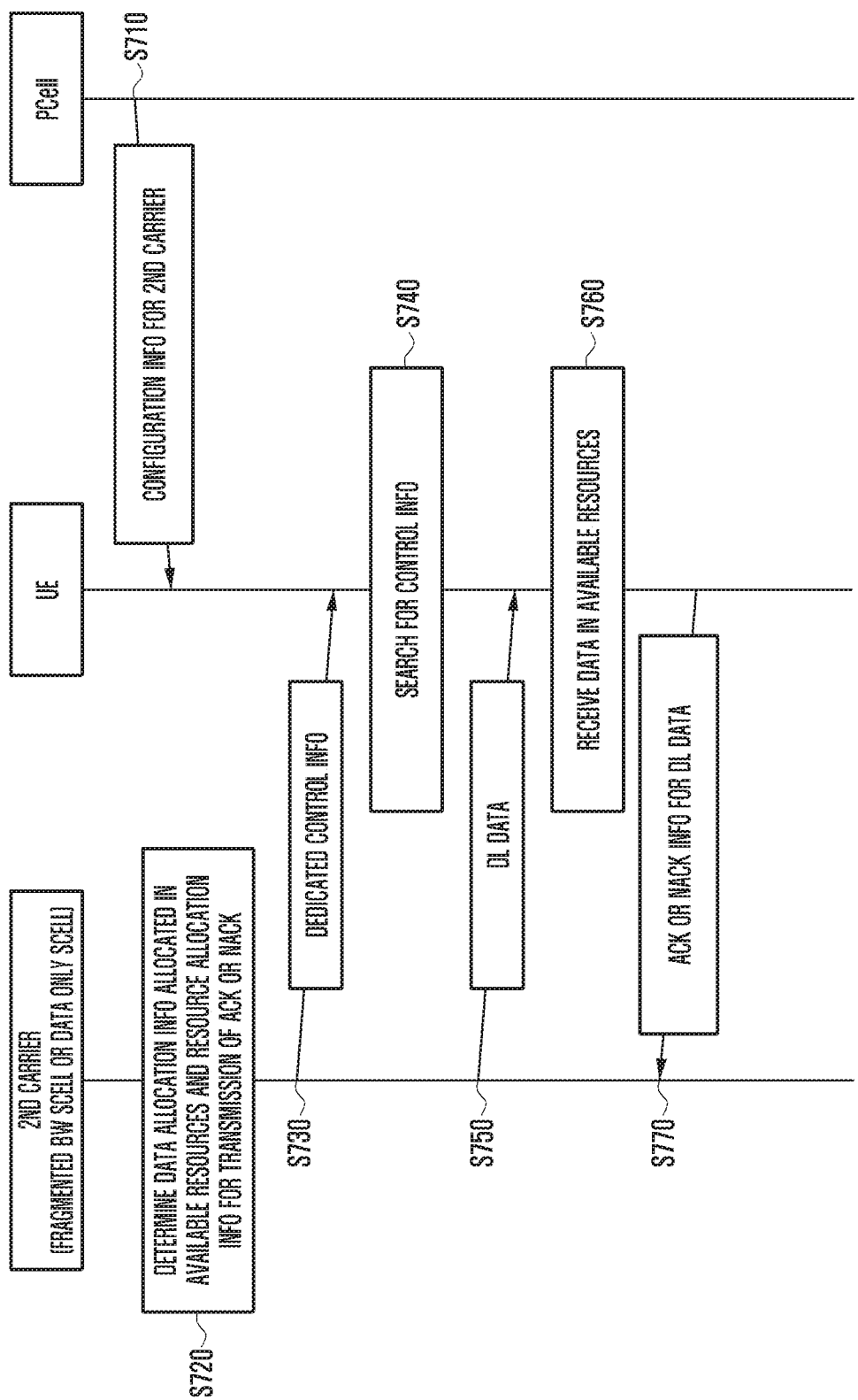
FIG. 7 is a diagram illustrating a method for a terminal to transmit and receive data through carrier aggregation according to an embodiment of the present invention.

FIG. 7 is a diagram illustrating a method for a terminal to transmit and receive data through carrier aggregation according to an embodiment of the present invention.

The UE may transmit and receive data through the second carrier as well. Therefore, the UE may transmit and receive data by using the configuration information for the second carrier received from the PCell through the initial access process.

Referring to FIG. 7, at step S710, the PCell may transmit the configuration information for the second carrier to the UE. At this time, the configuration information for the second carrier may be contained in the upper layer message, and may include the available resource related information. The details are the same as those described above, and are omitted in the following.

Therefore, at step S720, the second carrier may determine the data allocation information in the available resources and the resource allocation information for transmitting the ACK or NACK.

At step S730, the second carrier may transmit the dedicated control information to the UE by using the available resources in the bandwidth. At this time, the dedicated control information may contain a message having information allocated to transmit data in the available resources. For example, the information allocated for transmitting the downlink data may be expressed as shown in Table 3 below.

TABLE 3

...
[Dedicated Control Information Message]
...
Option 1) Inform index of predetermined resource allocation combination
Resource allocation: combination_index = 231
    (Range of total possible RB allocation combination indices: 0~512
    RB allocation combination in available resource in Fragmented BW
CC: 200~400. 0~199 and 401~512 are not usable
    Examples of predetermined resource allocation combination
    Combination_index = 0 : RB index 0~10
    Combination_index = 1 : RB index 11 ~ 20
...
Option 2) Explicitly inform index of resource allocation
Resource allocation: RB_index_start =25
                   RB_index_end = 50

TABLE 3-continued (Range of total possible RB indices: 0~99
RB allocation combination in available resource in Fragmented BW
CC: 20~60. 0~19 and 61~99 are not usable)
HARQ configuration
: RB allocation index = 255 (RB allocation combination in available resource)
ACK/NACK timing = 5 (Transmit after 5 subframes)

In this case, the information of the resource to which the data is allocated in the available resources may be indicated using a method of indicating one of the separately defined resource combinations or a method of explicitly indicating the index of the allocated resource.

The method of indicating one of the separately defined resource combinations may include a method of informing an index of any one of predetermined resource allocation combinations. For example, when the range of the total possible combinations is 0 to 512, the second carrier may be configured to use only combinations 200 to 400 and not to use 0 to 199 and 401 to 512.

Therefore, the second carrier may transmit the index of a combination allocated to transmit data in the combination 200 to 400, for example, the combination index 232, to the UE. In this case, the combination index 0 may indicate resource block indices 0 to 10, and the combination index 1 may indicate resource block indices 11 to 20. The UE may receive data from the resource identified through the combination index.

Alternatively, the second carrier may explicitly inform the index of the allocated resource block. In this case, the second carrier may indicate the indices of the start and end of the allocated resource block.

For example, it is assumed that the index range of all available resource blocks is 0 to 99 and the index range of the available resource block of the second carrier is 20 to 60. Among the index ranges 20 to 60 of available resource blocks, the second carrier may set the start resource index (RB_index_start) to 25 and the end resource index (RB_index_end) to 50. Therefore, the UE may transmit and receive data in the resource indices 25 to 50.

In addition, HARQ configuration information may be included in the control information. The HARQ configuration information may include an index of a resource block through which the ACK or NACK is to be transmitted in the available resource, and the subframe timing may be included.

The UE that receives the control information may search for the control information at step S740. At this time, the UE may search for control information only in the available resources within the bandwidth. That is, while the PCell or SCell capable of utilizing the entire band searches for the control information in the whole bandwidth, and the control information transmitted by the second carrier is searched for in the available resource. Thus, the number of candidates that the UE should search for may be reduced.

Then, at step S750, the base station may transmit downlink data by using the available resource.

Therefore, at step S760, the UE may receive data in the available resource.

In addition, at step S770, the UE may transmit ACK/NACK information of data transmission to the base station in the available resource.

As such, the base station can transmit the control information, the data, and the reference signal in the available resource, and the UE can receive the above in the available resource. The same procedure may be applied to uplink transmission as well.

Accordingly, data can be transmitted on the second carrier as well, which is a bandwidth not determined in advance, so that efficient data transmission and reception can be realized.

Figure 8A:
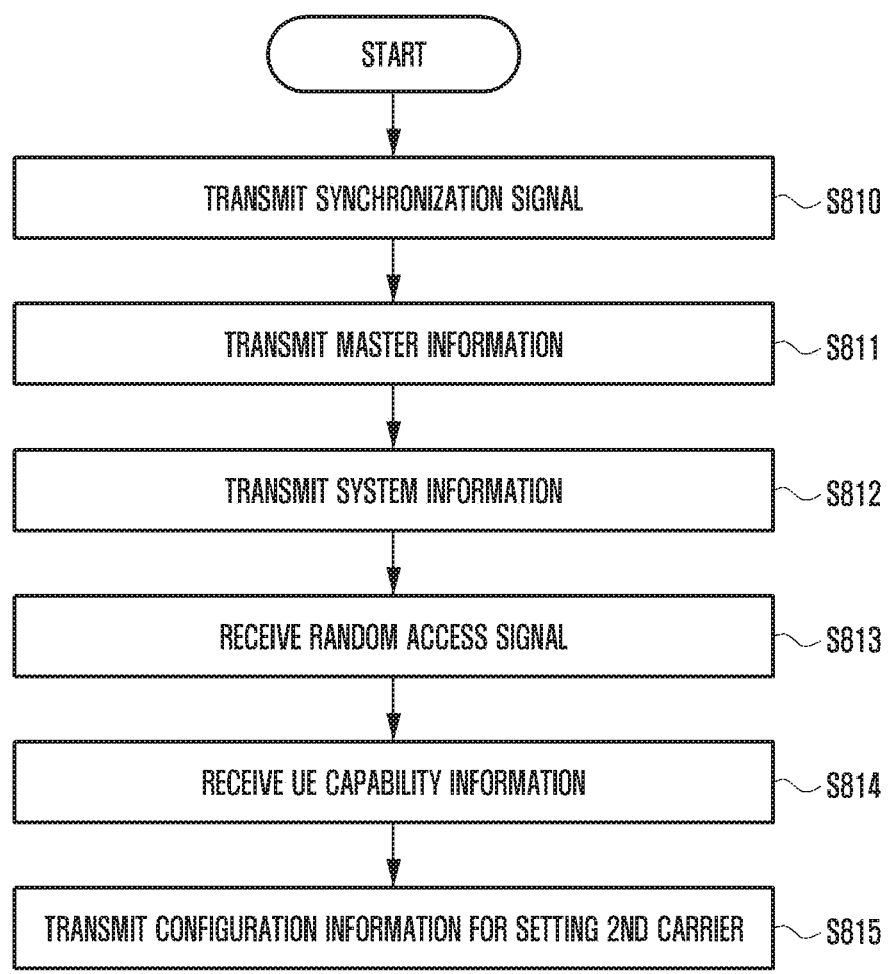
FIG. 8A is a diagram illustrating an operation of a base station according to an embodiment of the present invention.

FIG. 8A is a diagram illustrating an operation of a base station according to an embodiment of the present invention.

Specifically, FIG. 8A shows the operation of the PCell. Referring to FIG. 8A, at step S810, the PCell may transmit the synchronization signal for the PCell and thereby perform synchronization with the UE.

In addition, the PCell may transmit the broadcast information (or master information) about the PCell to the UE at step S811, and may transmit the system information on the PCell to the UE at step S812.

Also, at step S813, the PCell may receive the random access signal from the UE and perform the random access procedure.

In addition, the PCell may request the UE capability information from the UE and receive the UE capability information from the UE at step S814.

Through the above process, the PCell may transmit/receive data to/from the UE. Specifically, the PCell may transmit, to the UE, the control information including at least one of the resource allocation information for transmitting and receiving data or the resource allocation information for transmitting ACK or NACK, and may transmit downlink data or receive uplink data in the allocated resource. Also, the PCell may receive ACK or NACK for the downlink data or transmit ACK or NACK for the uplink data. The details are the same as those described above and will be omitted in the following.

Meanwhile, when the second bandwidth support indicator is included in the UE capability information, or when the second bandwidth support indicator or the second carrier support indicator is set to 1 or supported, the PCell may further set the second carrier to the UE.

Therefore, at step S815, the PCell may transmit, to the UE, the configuration information for setting the second carrier.

The configuration information may include information for initial access to the second carrier. The information for the initial access may include at least one of the synchronization signal for synchronization with the second carrier and the master information of the second carrier.

Further, the configuration information for setting the second carrier may include at least one of the system information of the second carrier, the information (second carrier indicator information) indicating that the second carrier operates in the second bandwidth or indicating that the second carrier operates in the first bandwidth and is set to transmit only data and data-related control information, the configuration information (Synchronization-reference signal related information) instructing the synchronization and channel state of the second carrier to follow the PCell or the SCell designated by the PCell, the information (Available resource related information) indicating the available resources within the bandwidth of the second carrier, or the configuration information (channel state information configuration information) indicating whether the reference signal for channel state reporting is supported. The details are the same as those described above, and will be omitted below.

Through the above process, the PCcell may set the second carrier to the UE, so that the base station can transmit and receive data to and from the UE through the second carrier.

Figure 8B:
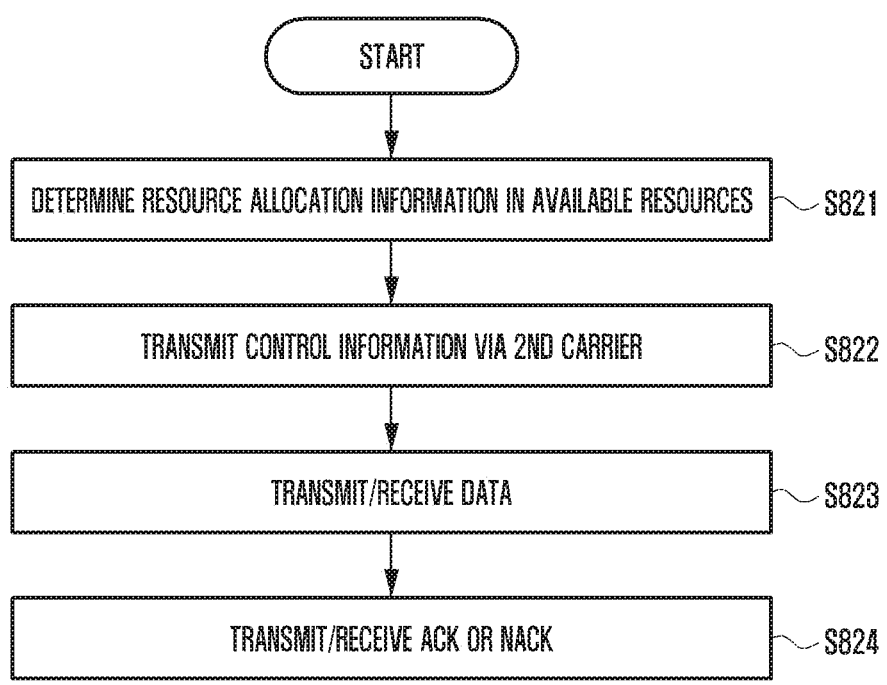
FIG. 8B is a diagram illustrating another operation of a base station according to an embodiment of the present invention.

FIG. 8B is a diagram illustrating another operation of a base station according to an embodiment of the present invention.

Specifically, FIG. 8B shows the operation of the second carrier which is the SCell. Referring to FIG. 8B, the second carrier may determine the resource allocation information in the available resource at step S820. At this time, the resource allocation information may include at least one of the resource allocation information for transmitting/receiving data and the resource allocation information for transmitting/receiving ACK or NACK.

The second carrier may transmit the control information to the UE at step S821, and may transmit downlink data to the UE or receive uplink data at step S818. At this time, the control information may include the resource allocation information allocated in the available resource.

In addition, at step S819, the second carrier may receive ACK or NACK information for the downlink data or transmit ACK or NACK information for the uplink data.

As such, the base station can transmit and receive data to and from the UE by using the second carrier.

FIG. 9 is a diagram illustrating an operation of a terminal according to an embodiment of the present invention.

Referring to FIG. 9, at step S910, the UE may receive the synchronization signal for the PCell and thereby perform synchronization with the PCell.

In addition, the UE may receive the broadcast information (or master information) at step S911, and receive the system information at step S912. Also, at step S913, the UE may transmit the random access signal, and thereby perform the random access procedure with the PCell.

Through the above process, the UE may transmit and receive data with the PCell.

In addition, the UE may receive a request for the UE capability information and then transmit the UE capability information at step S914.

When the UE is capable of supporting the second bandwidth, the UE may insert the second bandwidth support indicator or the second carrier support indicator in the UE capability information. Alternatively, the UE may set the second bandwidth support indicator or second carrier support indicator of the UE capability information to 1 or supported. When the UE can support the second bandwidth or the second carrier, the base station may additionally set the second carrier to the UE.

Therefore, at step S915, the UE may receive the configuration information for setting the second carrier through the PCell.

The configuration information may include information for initial access to the second carrier. The information for the initial access may include at least one of the synchronization signal for synchronization with the second carrier and the master information of the second carrier.

Further, the configuration information for setting the second carrier may include at least one of the system information of the second carrier, the information (second carrier indicator information) indicating that the second carrier operates in the second bandwidth or indicating that the second carrier operates in the first bandwidth and is set to transmit only data and data-related control information, the configuration information (Synchronization-reference signal related information) instructing the synchronization and channel state of the second carrier to follow the PCell or the SCell designated by the PCell, the information (Available resource related information) indicating the available resources within the bandwidth of the second carrier, or the configuration information (channel state information configuration information) indicating whether the reference signal for channel state reporting is supported. The details are the same as those described above, and will be omitted below.

Thus, the second carrier is set in the UE, so that the UE can transmit and receive data to and from the base station via the second carrier.

Specifically, the UE may receive the control information through the second carrier at step S916. Here, the control information may include the resource allocation information in the available resource. The resource allocation information may include at least one of resource allocation information for transmitting/receiving data and resource allocation information for transmitting/receiving ACK or NACK.

Therefore, at step S917, the UE may receive downlink data or transmit uplink data through the second carrier.

In addition, at step S918, the UE may transmit ACK or NACK information for downlink data or ACK or NACK information for uplink data.

As described above, using a bandwidth not previously set, the UE can transmit and receive data to and from the base station.

Figure 10:
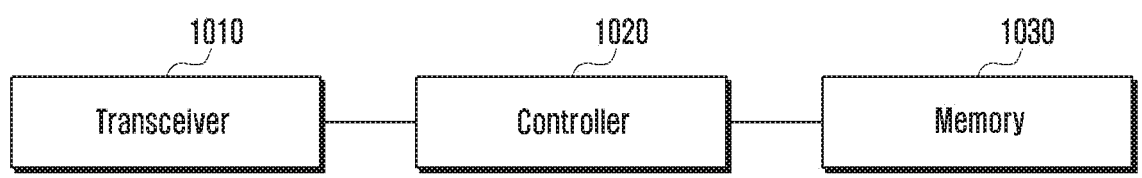
FIG. 10 is a diagram illustrating a configuration of a base station according to an embodiment of the present invention.

FIG. 10 is a diagram illustrating a configuration of a base station according to an embodiment of the present invention.

Referring to FIG. 10, the base station may include a transceiver 1010, a controller 1020, and a memory 1030.

The transceiver 1010 may transmit and receive signals with other network entities. The transceiver 1010 may transmit and receive signals to and from the UE under the control of the controller.

The controller 1020 may perform synchronization with the UE and the PCell by transmitting the synchronization signal to the PCell. In addition, the controller 1020 may transmit the broadcast information (or master information) about the PCell to the UE, and transmit the system information about the PCell to the UE. Also, the controller 1020 may receive the random access signal from the UE, and perform the random access procedure.

Through the above process, the controller 1020 may transmit and receive data to and from the UE via the PCell.

In addition, the controller 1020 may request the UE capability information from the UE and receive the UE capability information from the UE. In this case, when the UE capability information includes the second bandwidth support indicator or the second carrier support indicator, or when the second bandwidth support indicator or the second carrier support indicator is set to 1 or supported, the controller 1020 may further set the second carrier to the UE.

Therefore, the controller 1020 may transmit the configuration information for setting the second carrier to the UE through the PCell.

The configuration information may include information for initial access to the second carrier. The information for the initial access may include at least one of the synchronization signal for synchronization with the second carrier and the master information of the second carrier.

Further, the configuration information for setting the second carrier may include at least one of the system information of the second carrier, the information (second carrier indicator information) indicating that the second carrier operates in the second bandwidth or indicating that the second carrier operates in the first bandwidth and is set to transmit only data and data-related control information, the configuration information (Synchronization-reference signal related information) instructing the synchronization and channel state of the second carrier to follow the PCell or the SCell designated by the PCell, the information (Available resource related information) indicating the available resources within the bandwidth of the second carrier, or the configuration information (channel state information configuration information) indicating whether the reference signal for channel state reporting is supported. The details are the same as those described above, and will be omitted below.

In addition, the controller 1020 may set the second carrier to the UE and transmit/receive data to/from the UE through the second carrier. Specifically, the controller 1020 may determine the resource allocation information in the available resource. Here, the resource allocation information may include at least one of resource allocation information for transmitting/receiving data and resource allocation information for transmitting/receiving ACK or NACK.

The controller 1020 may transmit the control information to the UE via the second carrier, and may transmit downlink data to the UE or receive uplink data through the second carrier. At this time, the control information may include the resource allocation information allocated in the available resource.

In addition, the controller 1020 may receive ACK or NACK information for downlink data or transmit ACK or NACK information for uplink data.

As described above, the controller 1020 can transmit and receive data to and from the UE by using a bandwidth that is not set in advance.

The memory 1030 may store data such as a basic program, an application program, and setting information for the operation of the base station. In addition, the memory 1030 may store the UE capability information received from the UE. Also, the memory 1030 may store the configuration information for setting the second carrier to the UE.

Figure 11:
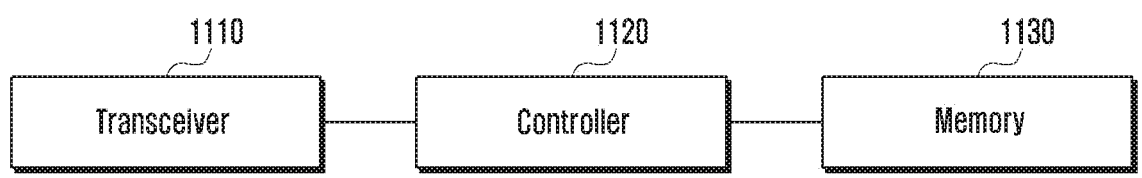
FIG. 11 is a diagram illustrating a configuration of a terminal according to an embodiment of the present invention.

FIG. 11 is a diagram illustrating a configuration of a terminal according to an embodiment of the present invention.

Referring to FIG. 11, the terminal (i.e., UE) may include a transceiver 1110, a controller 1120, and a memory 1130.

The transceiver 1110 may transmit and receive signals with other network entities. The transceiver 1110 may transmit and receive, to and from the base station, information required for transmitting and receiving data with the PCell and the SCell. The controller 1120 may perform synchronization with the PCell by receiving the synchronization signal for the PCell. In addition, the controller 1120 may receive the broadcast information (or master information) and receive the system information. Also, the controller 1120 may transmit the random access signal and thereby perform the random access procedure with the PCell.

In addition, the controller 1120 may receive a request for the UE capability information request and transmit the UE capability information to the base station.

The controller 1120 may transmit and receive data to and from the base station through the PCell. Specifically, the controller 1120 may receive the control information including at least one of resource allocation information for transmitting/receiving data or resource allocation information for transmitting ACK or NACK through the PCell. In addition, the controller 1120 may receive downlink data or transmit uplink data. Also, the controller 1120 may receive ACK or NACK for uplink data or transmit ACK or NACK for downlink data through the PCell. The details are the same as those described above and will be omitted in the following.

In case of supporting the second bandwidth, the controller 1120 may include the second bandwidth support indicator in the UE capability information. Alternatively, the controller 1120 may set the second bandwidth support indicator or second carrier support indicator of the UE capability information to 1 or supported. When the UE is capable of supporting the second bandwidth or the second carrier, the base station may further set the second carrier to the UE.

Therefore, the controller 1120 may receive the configuration information for setting the second carrier through the PCell.

The configuration information may include information for initial access to the second carrier. The information for the initial access may include at least one of the synchronization signal for synchronization with the second carrier and the master information of the second carrier.

Further, the configuration information for setting the second carrier may include at least one of the system information of the second carrier, the information (second carrier indicator information) indicating that the second carrier operates in the second bandwidth or indicating that the second carrier operates in the first bandwidth and is set to transmit only data and data-related control information, the configuration information (Synchronization-reference signal related information) instructing the synchronization and channel state of the second carrier to follow the PCell or the SCell designated by the PCell, the information (Available resource related information) indicating the available resources within the bandwidth of the second carrier, or the configuration information (channel state information configuration information) indicating whether the reference signal for channel state reporting is supported. The details are the same as those described above, and will be omitted below.

Accordingly, the second carrier is set in the UE, so that the controller 1120 can transmit and receive data to and from the base station via the second carrier.

Specifically, the controller 1120 may receive the control information through the second carrier. Here, the control information may include the resource allocation information in the available resource. The resource allocation information may include at least one of resource allocation information for transmitting/receiving data and resource allocation information for transmitting/receiving ACK or NACK.

Therefore, through the second carrier, the controller 1120 may receive downlink data or transmit uplink data.

In addition, the controller 1120 may transmit ACK or NACK information for the downlink data or receive ACK or NACK information for the uplink data.

As such, the controller 1120 can transmit and receive data to and from the base station by using a bandwidth that is not set in advance.

The memory 1130 may store data such as a basic program, an application program, and setting information for the operation of the UE. In addition, the memory 1130 may store the configuration information for the PCell received through the PCell and the configuration information for the second carrier received through the PCell. Also, the memory 1130 may transmit the stored information to the controller 1120 in response to a request of the controller 1120.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

The invention claimed is:

1. A method performed by a base station in a wireless communication system, the method comprising:
   transmitting or receiving data on a primary cell (PCell);
   transmitting, on the PCell, configuration information for configuring a secondary cell (SCell), wherein a synchronization signal is not transmitted on the SCell; and
   transmitting or receiving data on the SCell, based on a synchronization with the SCell,
   wherein the synchronization with the SCell is acquired by a terminal based on a reception of a synchronization signal on the PCell.

2. The method of claim 1,
   wherein the transmitting the configuration information comprises:
      receiving terminal capability information on the PCell; and
      transmitting on the PCell, the configuration information for configuring the secondary cell (SCell), in case that the terminal capability information includes information on supporting the SCell, and
      wherein the SCell does not transmit the synchronization signal.

3. The method of claim 1,
   wherein the PCell corresponds to a predetermined bandwidth for the base station, and
   wherein the SCell corresponds to a bandwidth other than the predetermined bandwidth for the base station.

4. The method of claim 1, further comprising:
   transmitting a reference signal in a resource determined based on reference signal related information in case that the reference signal related information is included in the configuration information;
   receiving channel state information determined based on the reference signal;
   transmitting, on the PCell, control information including resource allocation information for transmitting or receiving data on the SCell within available resources of a bandwidth other than a predetermined bandwidth for the base station; and
   transmitting or receiving data on the SCell, based on the control information.

5. A method performed by a terminal in a wireless communication system, the method comprising:
   transmitting or receiving data on a primary cell (PCell);
   receiving, on the PCell, configuration information for configuring a secondary cell (SCell), wherein a synchronization signal is not received on the SCell;
   acquiring a synchronization with the SCell based on a reception of a synchronization signal on the PCell; and
   transmitting or receiving data on the SCell, based on the synchronization with the SCell.

6. The method of claim 5, wherein the receiving the configuration information comprises:
   transmitting terminal capability information on the PCell; and
   receiving, on the PCell, the configuration information for configuring, the SCell in case that the terminal capability information includes information on supporting the SCell, wherein the SCell does not transmit the synchronization signal.

7. The method of claim 5,
   wherein the PCell corresponds to a predetermined bandwidth for a base station, and
   wherein the SCell corresponds to a bandwidth other than the predetermined bandwidth for the base station.

8. The method of claim 5, further comprising:
   receiving a reference signal in a resource determined based on reference signal related information in case that the reference signal related information is included in the configuration information;
   transmitting channel state information determined based on the reference signal;
   receiving, on the PCell, control information including resource allocation information for transmitting or receiving data on the SCell within available resources of a bandwidth other than a predetermined bandwidth for a base station; and
   transmitting or receiving data on the SCell, based on the control information.

9. A base station in a wireless communication system comprising:
   a transceiver; and
   a controller configured to:
   transmit or receive data on a primary cell (PCell),
   transmit, on the PCell, configuration information for configuring a secondary cell (SCell), wherein a synchronization signal is not transmitted on the SCell, and
   transmit or receive data on the SCell, based on a synchronization with the SCell,
   wherein the synchronization with the SCell is acquired by a terminal based on a reception of a synchronization signal on the PCell.

10. The base station of claim 9, wherein the controller is further configured to:
    receive terminal capability information on the PCell, and
    transmit, on the PCell, the configuration information for configuring the secondary cell (SCell), in case that the terminal capability information includes information on supporting the SCell,
    wherein the SCell does not transmit the synchronization signal.

11. The base station of claim 9,
    wherein the PCell corresponds to a predetermined bandwidth for the base station, and
    wherein the SCell corresponds to a bandwidth other than the predetermined bandwidth for the base station.

12. The base station of claim 9, wherein the controller is further configured to:
    transmit a reference signal in a resource determined based on reference signal related information in case that the reference signal related information is included in the configuration information,
    receive channel state information determined based on the reference signal,
    transmit, on the PCell, control information including resource allocation information for transmitting or receiving data on the SCell within available resources of a bandwidth other than a predetermined bandwidth for the base station, and
    transmit or receive data on the SCell, based on the control information.

13. A terminal in a wireless communication system comprising:
    a transceiver; and
    a controller configured to:
    transmit or receive data on a primary cell (PCell),
    receive, on the PCell, configuration information for configuring a secondary cell (SCell), wherein a synchronization signal is not received on the SCell,
    acquire a synchronization with the SCell based on a reception of a synchronization signal on the PCell, and
    transmit or receive data on the SCell, based on the synchronization with the SCell.

14. The terminal of claim 13, wherein the controller is further configured to:
- transmit terminal capability information on the PCell,
- receive, on the PCell, the configuration information for configuring the SCell in case that the terminal capability information includes information on supporting the SCell, wherein the SCell does not transmit the synchronization signal,
- receive a reference signal in a resource determined based on reference signal related information in case that the reference signal related information is included in the configuration information,
- transmit channel state information determined based on the reference signal,
- receive, on the PCell, control information including resource allocation information for transmitting or receiving data on the SCell within available resources of a bandwidth other than a predetermined bandwidth for a base station, and
- transmit or receive data to on the SCell, based on the control information.

15. The terminal of claim 13,
- wherein the PCell corresponds to a predetermined bandwidth for a base station, and
- wherein the SCell corresponds to a bandwidth other than the predetermined bandwidth for the base station.

\* \* \* \* \*